Aug. 18, 1936. V. J. HARRIS 2,051,706
LUBRICATING DEVICE
Filed Sept. 15, 1930   5 Sheets-Sheet 1
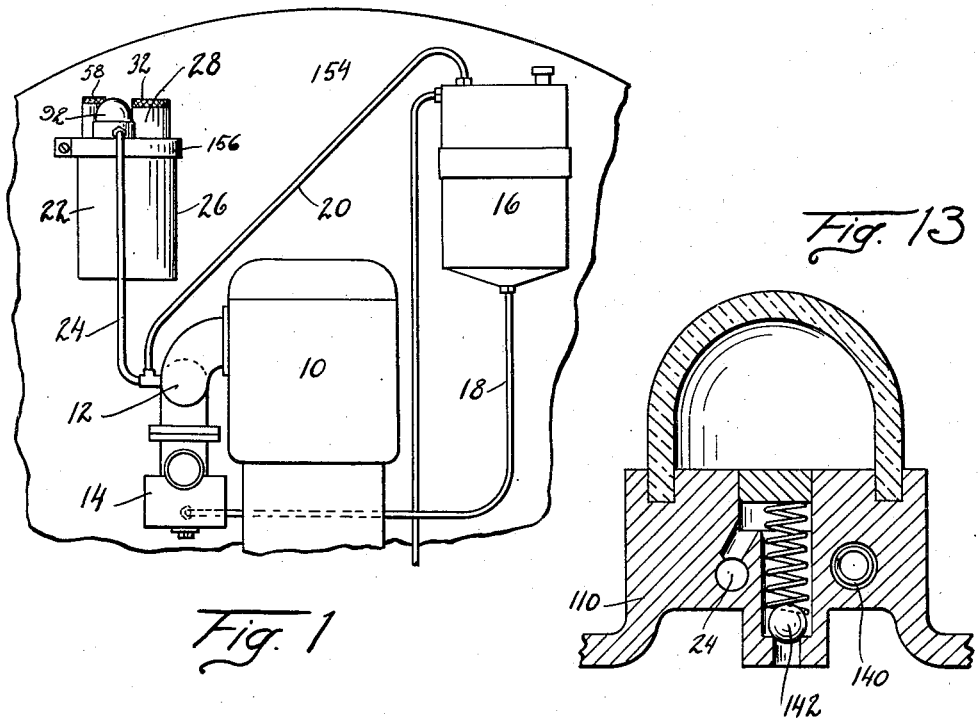
Fig. 1
Fig. 13
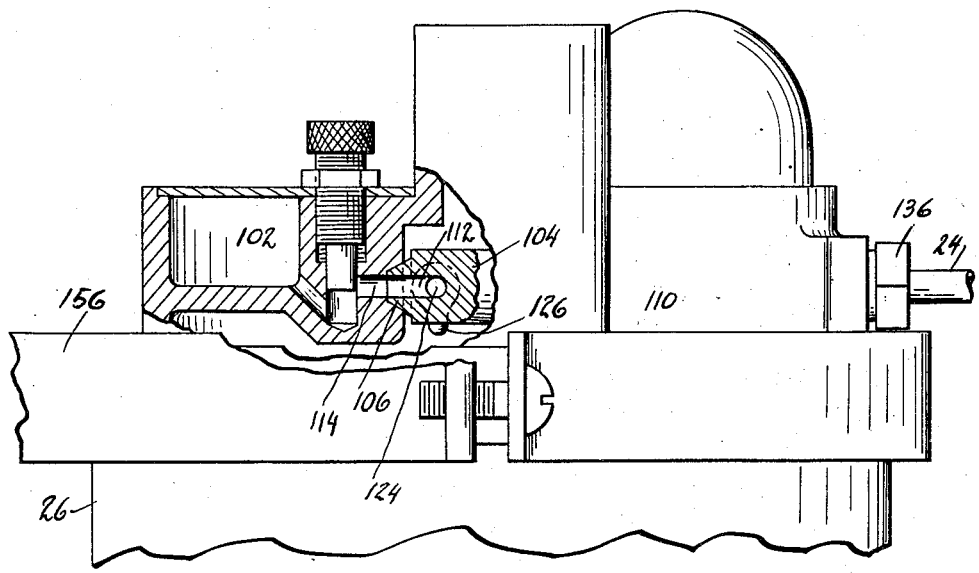
Fig. 12
INVENTOR.
Vernon J. Harris
BY
ATTORNEYS Aug. 18, 1936.　　　V. J. HARRIS　　　2,051,706
LUBRICATING DEVICE
Filed Sept. 15, 1930　　5 Sheets-Sheet 2
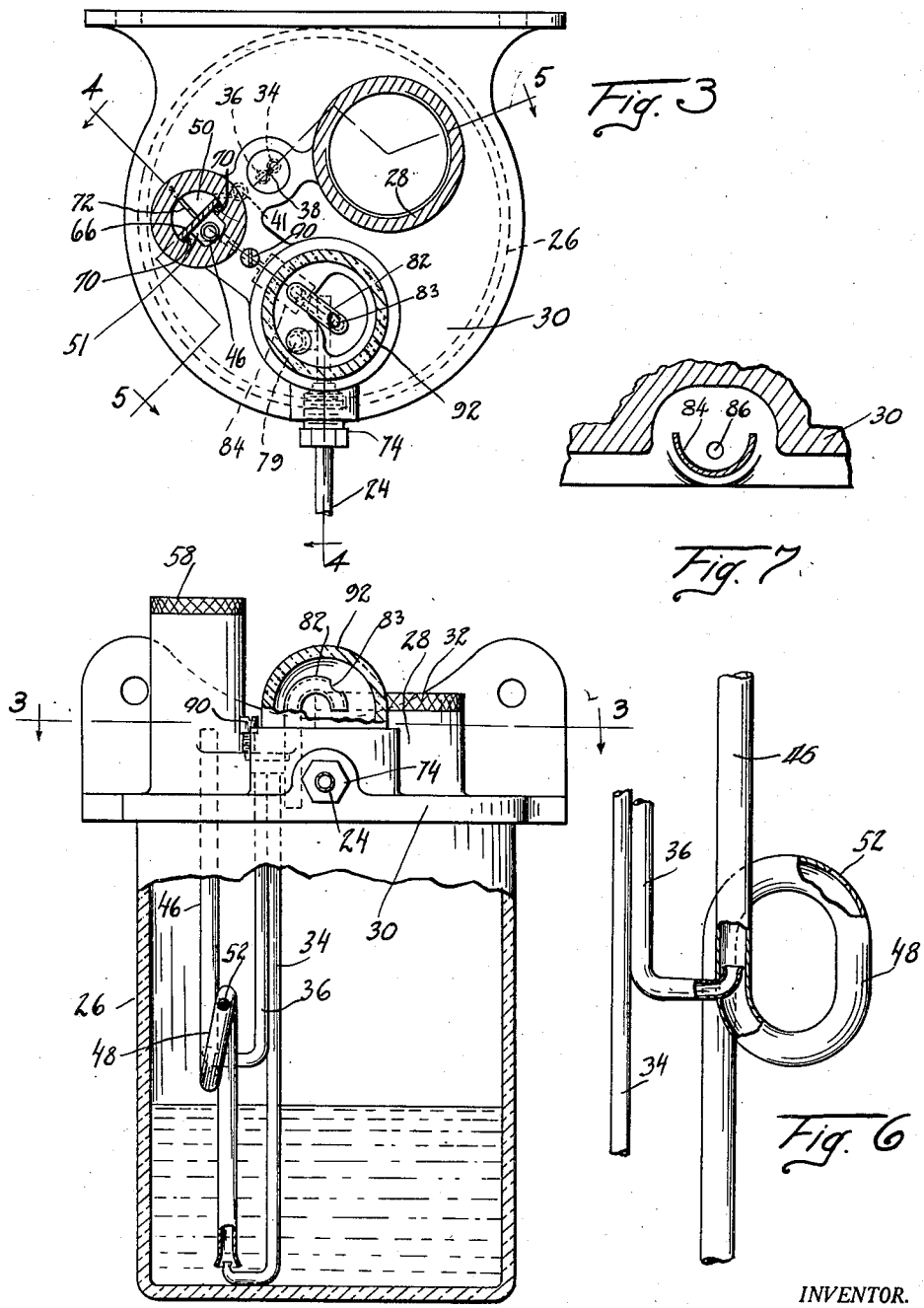
INVENTOR.
Vernon J. Harris
BY Parker & Burton
ATTORNEYS

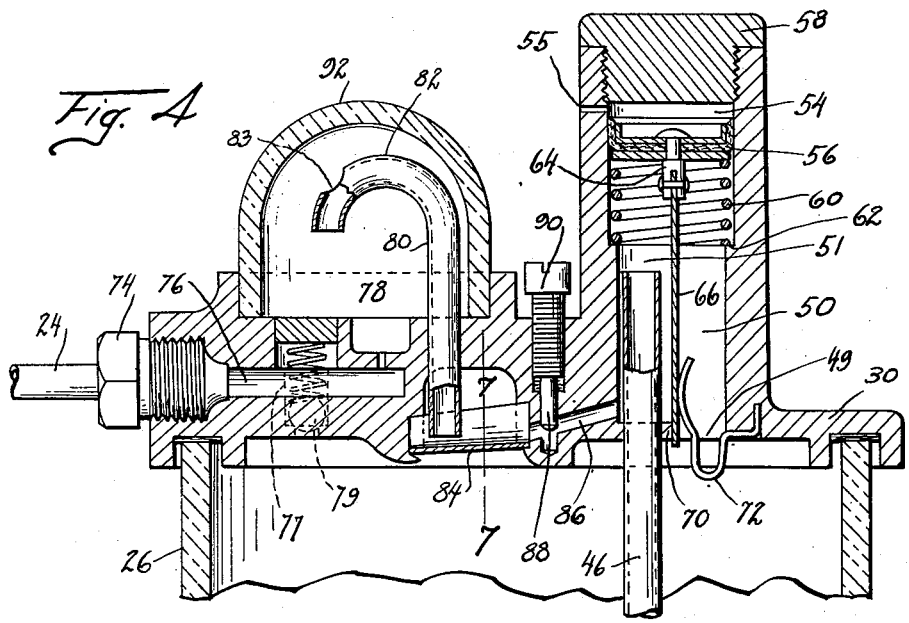
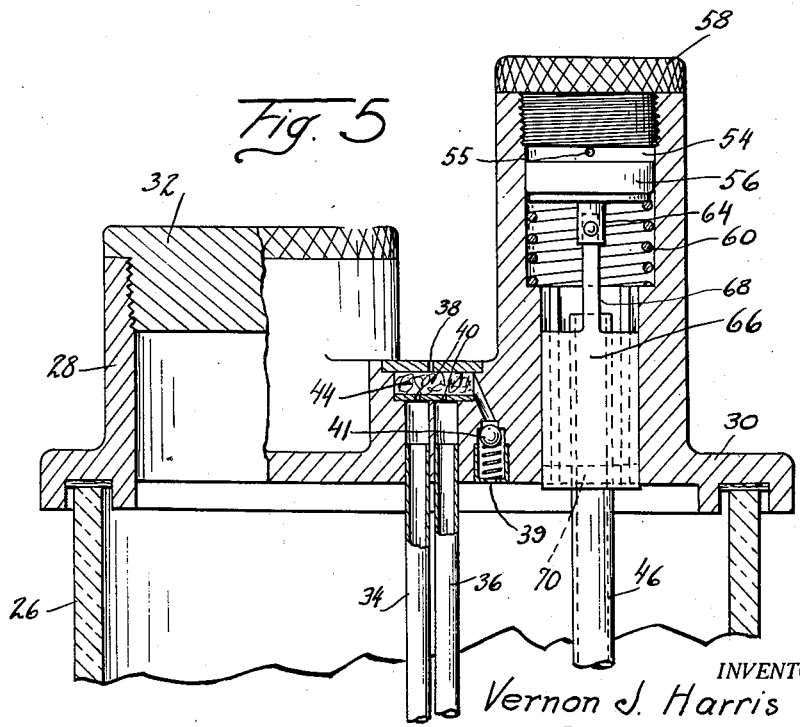

Aug. 18, 1936.  V. J. HARRIS  2,051,706
LUBRICATING DEVICE
Filed Sept. 15, 1930  5 Sheets-Sheet 4

INVENTOR.
Vernon J. Harris
BY
ATTORNEYS

Aug. 18, 1936.    V. J. HARRIS    2,051,706
LUBRICATING DEVICE
Filed Sept. 15, 1930    5 Sheets-Sheet 5

INVENTOR.
Vernon J. Harris
BY
Parker & Burton
ATTORNEYS

Patented Aug. 18, 1936

2,051,706

UNITED STATES PATENT OFFICE 2,051,706

LUBRICATING DEVICE

Vernon J. Harris, Cleveland, Ohio, assignor to Joseph Weidenhoff, Inc., Chicago, Ill., a corporation of Illinois Application September 15, 1930, Serial No. 481,996

12 Claims. (Cl. 123—196)

My invention relates to lubricating apparatus and has particular reference to oiling mechanism for delivering lubricating oil to the intake manifold of an internal combustion engine for the purpose of providing lubrication for the intake and exhaust valves, their respective valve ports, and the cylinder wall.

Oilers have been provided heretofore for this purpose. One type drew oil from a container into the intake manifold by suction in proportion to the amount of suction in the manifold. As a result, when the suction was greatest, as when the engine was idling, the maximum amount of lubricant was supplied, and when the suction was least, as at high speed, the least lubricant was supplied, which was a result exactly the opposite of the one desired. A second type furnished a constant supply of oil per minute at all times and under all varying running conditions which obviously would be wasteful at low speeds or insufficient at high speeds.

An object of my invention is to secure maximum efficiency in an oiler which may be used for lubrication as above described. As stated above, the suction available to draw oil from a given supply source to the intake manifold, such suction resulting from the vacuum created by the engine, varies inversely as the need for lubricating the various parts. In designing my improved lubricating mechanism I have made use of this principle to the extent that I provide means, herein illustrated as a pressure controlled valve structure, inserted between the source of lubricant supply and the suction line through which the lubricant is drawn to the manifold for controlling the rate of flow of the lubricant. I propose to control the operation of this valve by the suction in such way that the valve opens to permit a more rapid flow of lubricant upon decreased suction in the line.

Another object of my invention is to include means whereby the quantity of oil reaching the parts to be lubricated may be varied manually to meet the requirements of different jobs and grades of oil, et cetera. In accomplishing this object I propose to provide a manually adjustable control element limiting the quantity of oil which may subsequently be automatically controlled as to its rate of flow by my suction governed valve control. In this way I attain a very precise adjustment mechanism whereby extremely efficient operation involving little or no waste results. While several specific structures have been illustrated herein the basic principle involved is the same.

Various other objects and meritorious features of my invention will be apparent from the following disclosure taken in conjunction with the drawings wherein:

Fig. 1 is a diagrammatical illustration of the various elements involved,

Fig. 2 is an elevation, partly in section, of my oiler,

Fig. 3 is a section on 3—3 of Fig. 2,

Fig. 4 is a section on 4—4 of Fig. 3,

Fig. 5 is a section on 5—5 of Fig. 3,

Fig. 6 illustrates a detail of my oiler,

Fig. 7 is a section on 7—7 of Fig. 4,

Fig. 12 is a section on 12—12 of Fig. 10,

Fig. 13 is a section on 13—13 of Fig. 11, and

Figures 8, 9, 14:
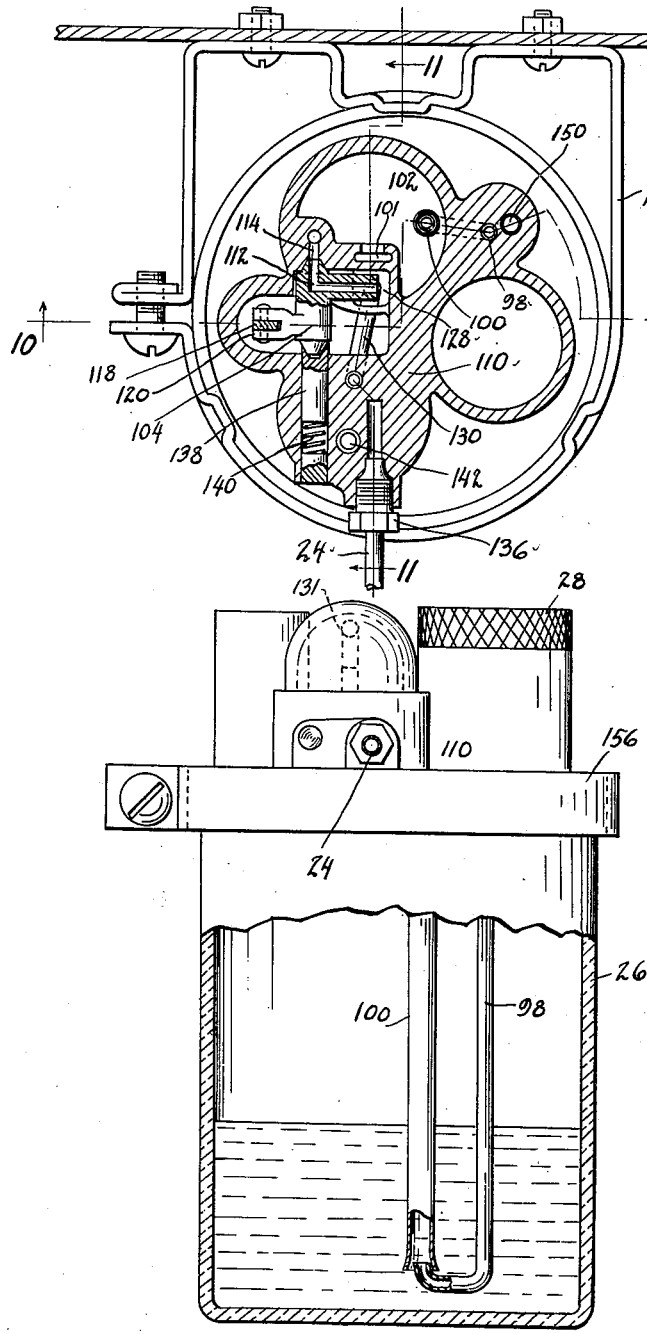
Fig. 8 illustrates a modified form of my oiler.
Fig. 9 is a sectional plan view taken along 9—9 of Fig. 10.
Fig. 14 is a detail illustration.
Figure 10:
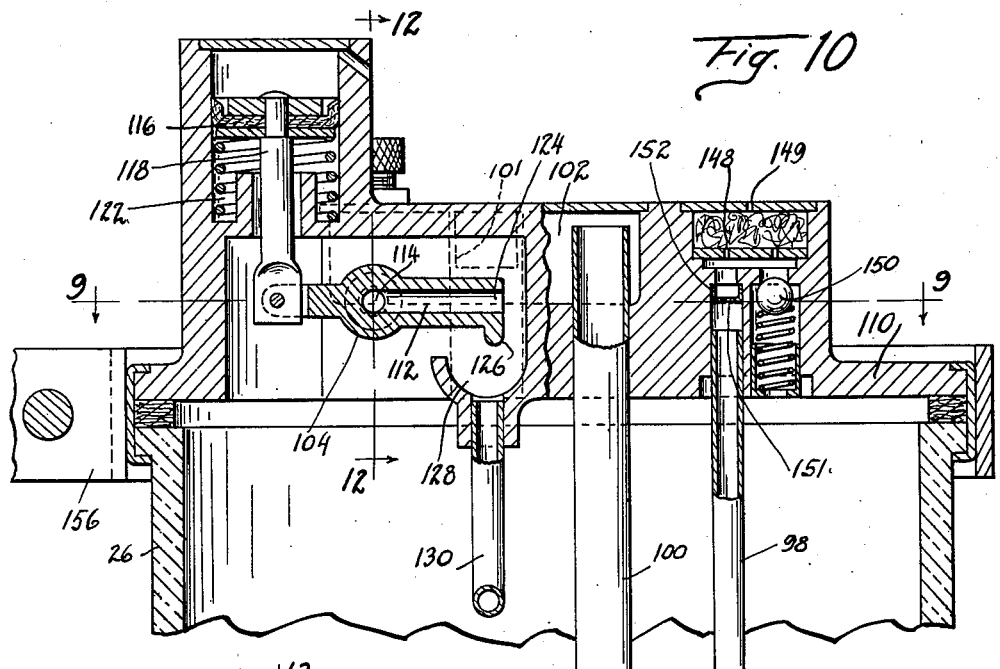
Fig. 10 is a section along 10—10 of Fig. 9.
Figure 11:
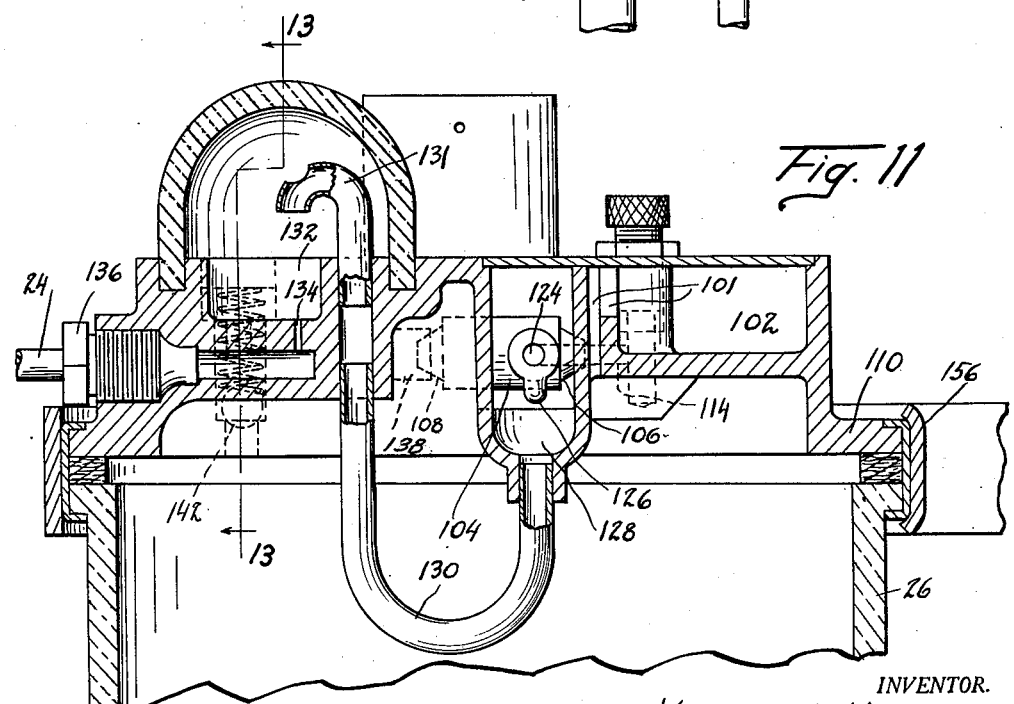
Fig. 11 is a section on 11—11 of Fig. 9.

Important features reside in the provision of an oil container communicating with the suction side of an engine so that oil may be delivered therefrom to the engine and a depression maintained in the container to assist in the delivery of oil; an oil container as described having a secondary oil reservoir from which oil is delivered to the engine and means automatically responsive to vacuum to control the quantity of oil delivered from the secondary reservoir to the engine; control means responsive to the depression in the container to regulate the volume of oil delivered; and means for delivering a variable and small quantity of oil in an air stream from the container to the engine and for indicating the quantity delivered in the stream and subsequently augmenting the air supply in the stream by air admitted from the container to maintain the depression therein.

In the diagrammatical illustration of Fig. 1 the numeral 10 represents a conventional internal combustion engine, to the intake manifold 12 of which a carburettor 14 is secured in usual fashion. The carburettor is fed from the vacuum tank 16 through the line 18. The vacuum in tank 16 is maintained in the customary fashion by the suction created through the line 20 from the intake manifold. My improved oiler is illustrated, also diagrammatically, in this figure by the numeral 22 and is connected by suction line 24 with the intake manifold 12. The oiler comprises a primary supply source, or bottle, 26 which is provided with a filler cap 28.

One embodiment of my invention is illustrated in Figs. 2 to 7, inclusive, wherein the primary source of lubricant supply is preferably a glass bottle 26 to facilitate checking of the oil supply, the top of which is covered with a plate such as a casting 30 which seats about the top peripheral wall of the bottle. This casting is provided with the aforesaid filler cap 28 into which the closure 32 is threaded. Inserted through two cored out portions of the casting are air inlet tubes 34 and 36, these tubes having access to atmospheric pressure through a vent 38 and smaller individual vents 40. These latter vents are located in a small plate which rests upon the top of the tubes 34 and 36, and an air cleaner, or filter, 44 cleanses the air prior to its ingress into the tubes.

Tube 34 extends to the bottom of the bottle 26 and is turned upwardly into the flared lower end of another tube or standpipe 46. The flare at the bottom of tube 46 is such as to provide but a small clearance about the opening of tube 34. Tube 46 extends upwardly and is bent into a single coil 48, as clearly indicated in Fig. 6, continuing on upwardly through an opening in the casting 30 and opening into a portion 51 of a cored out chamber 50 in the casting. The coil 48 is provided at its upper portion with an aperture 52. Tube 36 extends into the tube 46 at that portion where the coil straightens to again start its upward path below the aperture 52 and below the oil level standing in the coil when elevated thereinto as described. As in the case of tube 34, the end opening of tube 36 is so enlarged as to provide but a small clearance between the walls of tube 46 and itself.

A chamber 54 forms an upper continuation of chamber 50 and constitutes what may be termed the valve casing, wherein an air piston assembly 56 is free to travel. The piston 56 is normally held against the cap 58 of the valve casing by means of a coil spring 60 seated between the said piston assembly and a ledge 62 at the bottom and around the inner walls of the said casing 54. The upper portion of chamber 54 above the piston is open to the atmosphere through a restricted vent 55.

Secured to the piston stem 64 and adapted to slide within the chamber 50 is a blade 66 which extends across the diameter of said chamber 50 and throughout its length. The upper portion of blade 66 is cut away upon each side as indicated at 68 in Fig. 5, and the said blade is held against ledges 70, which extend longitudinally of the chamber 50 on opposite sides thereof, by means of a spring member 72 thereby dividing chamber 50 into two parts and forming the chamber 51 therein which serves as the secondary reservoir to receive oil from the standpipe 46. Chamber 50 is cut away at the bottom as at 49 to permit oil overflowing at cut away portions 68 above the blade 66 to fall back into the bottle. The spring 72 holds the blade 66 against the ledges 70 so as to form a sufficiently tight seal therewith to constitute a secondary reservoir for the purpose described.

The suction line 24 is connected, through a threaded nipple 74, with a cored out passage 76 in casting 30 which connects with a larger cored out tray portion 78. A tube 80 having an upper turned over goose neck portion 82 above the tray portion 78 extends down through the casting 30 to open above a trough-like member 84 securely positioned within the casting 30. This trough like member 84 receives oil from the secondary reservoir portion 51 of valve chamber 50 through a passageway 86. Stem 88 of a manually adjustable threaded valve 90 extends down into passage 86 intermediate the extremities thereof. By adjusting the valve 90 the flow of oil through passage 86 by gravity from chamber 51 to oil trough 84 may be prevented, or permitted to any desired extent. In this way regulation on the flow of oil is imposed by the initial manual setting to suit the particular job, and within the limits so imposed automatic control is exercised.

The vacuum in the suction line 24 of course produces a corresponding, though generally a slightly less, vacuum in the bottle above the oil level. The bottle is what might be termed a closed bottle. It has, of course, the air intake tubes 34 and 36 heretofore described. The same depression is of course present in valve chamber 50 as exists in the bottle. Variation in depression in the intake manifold produces of course a proportionate variation in depression in the bottle though the depression in the bottle may differ slightly from that in the intake, due to one reason or another.

It is evident from the above description that with any variation of the pressure in the chamber 50 below piston 56 the atmospheric pressure above the piston assembly will actuate the said piston to cause the blade 66 to move upward and downward within the chamber 50. Oil issuing from the top of tube 46 will be held in the portion of chamber 50 on the same side of blade 66 as is the tube 46 by means of blade 66, but should the oil rise to a point above the cut away portion 68 it will over-flow into the bottle 26. The extent of the head of oil in chamber 51 is therefore determined by the position of the blade 66.

The variation in the rate of oil flow is secured by the variation in the head of oil in secondary chamber 51 which variation in head is obtained by the travel of the blade 66. As the blade 66 is lowered due to increase in vacuum in chamber 50 the level of the oil, and hence the head of oil, above the passage 86 will be decreased, resulting in a decreased force, and tending to cause less oil to flow by gravity through passage 86 into trough 84. As the blade lifts, when the vacuum is overcome by the spring 60 and the piston lifts, the head of oil is raised and more oil flows through passage 86. The head of oil in chamber 51 therefore varies inversely with the depression in the bottle.

A transparent dome 92 is inserted in the casting 30 over the goose neck portion 82 of tube 80 for the purpose of permitting the user to inspect the drop by drop flow of the oil.

In the operation of the device here described, the starting of the engine creates a depression on the bottle and air is drawn through tubes 34 and 36. These tubes deliver air into the stand pipe 46. The air rising through the standpipe lifts oil in a succession of bubbles to the secondary reservoir 51. This action is somewhat like that which produces soap bubbles in a pipe. The particular structure is highly efficient. Until the oil in the bottle 26 reaches a level below that of aperture 52 in the coil 48 in the stand pipe oil will flow through the said aperture and into said coil and around to a position to where it may be drawn up along the wall of the tube 46 by the air admitted through the air tube 36.

When the oil level falls below that of the aperture 52 the oil will then be drawn up from the bottom of the tube 46 by air entering through air tube 34, and upon the oil reaching the point in the standpipe 46 where the tube 36 enters it, the effort of lifting the oil the remaining distance will be carried on by the air entering through the tube 36. Therefore a relatively deep bottle or source of oil supply may be employed and such number of secondary lifts as are necessary may be provided, as there is a limited maximum elevation that a sufficient quantity of oil can be lifted in this manner with air entering through one inlet.

Oil which has entered the secondary reservoir 51 is allowed to flow from there by gravity through passageway 86 to oil pan 84 where it is picked up by the tube 80 and drawn therethrough by suction. It falls from the outlet of the goose neck portion 82 in drops and is visible under the transparent dome 92. An air outlet 83 is shown in goose neck 82 to permit the discharge of the air and to facilitate the discharge of the oil from the lower end of the tube in drops which may be measured.

From the pan 78 underneath the glass dome 92 the oil is drawn out through the cored out passageway 76 and suction tube 24 into the intake manifold to be discharged to the engine.

Air, of course, enters with the oil through the tube 80 but the amount of air mixed with the oil is greatly increased after the oil passes through the glass dome 92 by air admitted to the passageway 76 from the bottle through the passageway 77 which is controlled by the ball check valve assembly 79. The admission of air at this point to be exhausted from the bottle with the oil stream serves to maintain the depression in the bottle which would otherwise be overcome by the air admitted thereto by the atmosphere through air inlet 38.

The greater portion of the air admitted through the opening 38 does not pass through the tubes 34 and 36. If it did, there would be too much air going through these tubes to satisfactorily function to lift the oil in the standpipe as described. The greater portion of this air enters the bottle directly above the oil level rather than below it and through the passageway 39 which is controlled by the ball check valve assembly 41.

The ball check valve assembly 41 and ball check valve assembly 79 are each arranged to open easily against the resistance of their retaining spring upon the slight variation in pressure against the ball so that in the first case almost the entire quantity of air admitted through the opening 38 will enter the bottle through the air check valve 41 and in the second case the greater portion of air taken out of the bottle in the air stream will be taken out through the ball check valve assembly 79.

In the modification illustrated in Figs. 8 through 14 the rate of flow is also automatically varied by varying the head tending to force the oil to a position from which it may be sucked into the intake manifold, but the head is varied by shifting the height of the outlet of the oil from the secondary reservoir instead of shifting the level of the oil as was done in the first modification heretofore described.

In this modification the air emitted from the tube 98 draws oil up along the walls of tube 100 in the manner already described, and the oil thus drawn up overflows into a secondary reservoir 102, which has an overflow back into the bottle for an excess supply through passageway 101. An element 104, clearly illustrated in Fig. 14 is provided with end bearings 106 and 108 which are seated in corresponding bored out portions of the top casting 110 (Fig. 9). End bearing 108 is, however, directly supported by a spring pressed plunger 138 as shown in Fig. 9. This element 104 is provided with a cored out passage 112 extending axially through bearing 106, which passage communicates as clearly indicated in Fig. 12 with a passage 114 opening into the secondary reservoir 102. This element serves to provide the outlet from chamber 102.

The piston assembly 116 actuates the piston stem 118 in the manner already described with reference to my first modification and in response to variation of vacuum. The vacuum or depression of course varies in the bottle proportionately as it varies in the engine as described in connection with the first form shown. The opposite extremity of piston stem 118 is pivoted to a bifurcated portion 120 of element 104 whereby the rise and fall of the piston assembly due to the variations of vacuum in chamber 122 causes a corresponding, but inverse, rise and fall of the exit opening 124 of passage 112 as shown particularly in Fig. 10. Passageway 112 is of such reduced diameter that it stands full of oil, the oil clinging to the wall thereof, otherwise it would not function as described.

This exit is provided with a small depending nub 126 which, by the tendency of any oil in the passage to adhere to the surface of its support, tends to cause the oil to flow from passage 112 into the pocket 128 regardless of the tilting of member 104.

As the oil drops from opening 124 it falls into a trough like container 128 through which it is drawn by the suction in line 24 through tube 130 to subsequently drop out of the upstanding goose neck portion 131 of the said tube into a tray-like portion 132. From here it is drawn through a small aperture 134 into the suction line 24, which line is retained in the bottle top casting 110 by means of the threaded nipple 136.

The element 104 is snugly pivoted and sealed in position (Fig. 9) by means of a spring pressed plunger 138 slidable in a cored out portion of casting 30. This plunger is bored out at one extremity to form a seat for bearing 108 and is supported by a coil spring 140 at its other extremity.

The operation of this modified form is similar to that heretofore described except that it does not show any booster or reinforcing means corresponding to the second air inlet tube found in the first form. The variable head of oil is maintained by a pivotally supported outlet element 104 and its tilting controls the discharge of the oil. This tilting is, of course, in response to variation in vacuum in the bottle. This variation in vacuum or depression corresponds proportionately and directly with the variation in the vacuum in the manifold produced by the running of the engine under variable conditions though lagging slightly behind the changes in depression occurring in the manifold. The control exercised over the discharge of oil is, of course, as described in connection with the first modification exercised so as to vary the oil supply in an inverse ratio to the variation in vacuum.

Air is admitted to the bottle through the tube 98 and through openings 148 and 149. The greater part of this air admitted through opening 149 passes through the ball check assembly 150 directly into the container above the oil level, but a limited portion passes through aperture 151 in bushing 152.

Air is drawn from the bottle into the oil stream, which already is made up largely of air, through the ball check valve assembly 142 in order to maintain the depression in the bottle against deterioration by the admission of air from the atmosphere. The air drawn from the bottle at this point enters the oil stream at a point between the visible air gauge and the intake manifold so it does not disturb the visual measuring of flow.

I propose to secure my oiler to the dash panel 154 by the metal strip 156 illustrated. This particular securing means has been described in detail in my Patent No. 1,960,584, issued May 29, 1934.

Various modifications of my structure may be apparent to those skilled in the art and for that reason I intend to limit myself only within the scope of the appended claims.

What I claim:

1. Lubricating apparatus comprising, in combination, a lubricant container, means for maintaining a depression in said container above the lubricant level, a standpipe in said container wherein lubricant is admitted to be elevated above the level in the container, and two air inlet tubes leading into the standpipe at different levels to admit air thereinto to elevate lubricant therethrough.

2. Lubricating apparatus comprising, in combination, a container for lubricant wherein a depression is maintained, a standpipe in the container through which lubricant may be elevated, a plurality of air inlet tubes communicating with the atmosphere and entering said standpipe at different levels to admit air thereinto, lubricant delivery means adapted to receive lubricant elevated through said standpipe and to discharge it from the container.

3. Lubricating apparatus comprising, in combination, a lubricant reservoir, a fluid suction line communicating with the reservoir above the lubricant level, a secondary lubricant container within the reservoir, means for maintaining a supply of lubricant in said secondary container including mechanism for delivering lubricant thereto from the reservoir, said container provided with a movable delivery outlet device adapted to deliver lubricant from the container into said suction line, and means responsive to variation in suction to actuate said delivery device to regulate the delivery of lubricant from the container.

4. Lubricating apparatus comprising, in combination, a lubricant reservoir, a fluid suction line communicating with the reservoir, a secondary lubricant container within the reservoir, means for maintaining a supply of lubricant in said secondary container including mechanism for delivering lubricant thereto from the reservoir, a swingably supported lubricant delivery member adapted to deliver lubricant from the container to said suction line and means responsive to variation in depression in the reservoir to tilt said swingably supported lubricant delivery member to regulate the delivery of lubricant from the container by raising or lowering the discharge outlet of said delivery member.

5. Lubricant apparatus comprising, in combination, a lubricant reservoir, a fluid suction line communicating with the reservoir, a secondary lubricant container within the reservoir, a standpipe leading from the reservoir to discharge into said container, an air conduit leading from the atmosphere into the bottom of said standpipe, said standpipe provided with a convolution therein provided with two apertures, a second air conduit leading from the atmosphere into one aperture in said convolution.

6. Lubricating apparatus comprising, in combination, a lubricant reservoir, a fluid suction line communicating therewith, a secondary container within the reservoir, a standpipe leading from adjacent to the bottom of the reservoir into said container and having a convolution spaced above its lower end provided with two apertures, an air conduit leading from the atmosphere into the lower end of the standpipe, a second air conduit leading from the atmosphere into the standpipe through one of said apertures.

7. Lubricating apparatus comprising, in combination, a lubricant reservoir, a fluid suction line communicating therewith, a secondary container within the reservoir having a movable wall portion, a standpipe within the reservoir through which lubricant is delivered into said secondary container, a suction responsive valve connected with said movable wall portion to actuate the same in response to suction actuation of said valve to vary the head of lubricant within said container.

8. Lubricating apparatus comprising, in combination, a lubricant reservoir, a fluid suction line communicating therewith, a standpipe within the reservoir, a secondary container adjacent to the upper end of the standpipe and having a wall portion movable with respect to the standpipe and adapted to regulate the lubricant level maintained therein, a suction responsive valve communicating with said movable wall portion to actuate the same.

9. Lubricating apparatus comprising, in combination, a lubricant container, means for maintaining a depression in said container above the lubricant level, a standpipe in said container wherein lubricant is admitted to be elevated above the level in the container, and air inlet tubes delivering air to said standpipe, one of said tubes being turned upwardly into the lower end of the standpipe and another tube entering the standpipe and being turned upwardly therein at a level above said lower end.

10. Lubricating apparatus for internal combustion engines comprising, in combination, a lubricant container, means for maintaining a depression in said container above the lubricant level including a suction conduit adapted to be connected to the intake manifold of the engine, a standpipe in said container wherein lubricant is admitted to be elevated above the level in the container, an air inlet tube for delivering air to said standpipe, an air inlet in the wall of the container for delivering air directly to the upper portion of said container, a check valve for controlling said air inlet, a secondary lubricant reservoir in the upper portion of said container into which said standpipe discharges, and means for delivering lubricant from said secondary reservoir to said suction conduit.

11. Lubricating apparatus for internal combustion engines comprising, in combination, a lubricant container, means for maintaining a depression in said container above the lubricant level including a suction conduit adapted to be connected to the intake manifold of the engine, a standpipe in said container wherein lubricant is admitted to be elevated above the level in the container, an air inlet tube for delivering air to said standpipe, an air inlet for delivering air to the upper portion of said container, a check valve for controlling said air inlet, a secondary lubricant reservoir in the upper portion of said container into which said standpipe discharges, and means for delivering lubricant from said secondary reservoir to said suction conduit including means for varying the flow of lubricant from said secondary reservoir in inverse proportion to the depression in the container.

12. Lubricating apparatus for internal combustion engines comprising, in combination, a lubricant container, means for maintaining a depression in said container above the lubricant level including a suction conduit adapted to be connected to the intake manifold of the engine, a standpipe in said container wherein lubricant is admitted to be elevated above the level in the container, an air inlet tube for delivering air to the standpipe below the liquid level in the container, a restricted air inlet for delivering air to the upper portion of said container, a secondary lubricant reservoir in the upper portion of said container into which said standpipe discharges, means for delivering lubricant from said secondary reservoir to said suction conduit, means for controlling the delivery of lubricant from said secondary reservoir to the suction conduit, and means establishing communication between the upper portion of the container and the suction conduit so as to admit air to the suction conduit on the engine side of said delivery control means.

VERNON J. HARRIS.